United States Patent
Cheung et al.

(10) Patent No.: US 9,605,860 B2
(45) Date of Patent: Mar. 28, 2017

(54) ENERGY SAVING-EXHAUST CONTROL AND AUTO SHUT OFF SYSTEM

(71) Applicant: Flextronics AP, LLC, Broomfield, CO (US)

(72) Inventors: Dason Cheung, Fremont, CA (US); Murad Kurwa, San Jose, CA (US); Richard Loi, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 606 days.

(21) Appl. No.: 14/067,665

(22) Filed: Oct. 30, 2013

(65) Prior Publication Data

US 2014/0127987 A1    May 8, 2014

Related U.S. Application Data

(60) Provisional application No. 61/721,899, filed on Nov. 2, 2012.

(51) Int. Cl.
*F24F 11/00*    (2006.01)
*F24F 7/00*    (2006.01)

(52) U.S. Cl.
CPC ...... *F24F 11/0079* (2013.01); *F24F 11/0001* (2013.01); *F24F 2007/001* (2013.01); *F24F 2011/0024* (2013.01); *F24F 2011/0042* (2013.01); *Y02B 30/746* (2013.01); *Y02B 30/78* (2013.01)

(58) Field of Classification Search
CPC .............. F24F 11/0079; F24F 11/0001; F24F 11/0076; F24F 11/0017; F24F 2011/0042; F24F 2011/0024; F24F 2007/001; Y02B 30/746; Y02B 30/78

USPC .. 454/56, 239, 340, 341, 345, 347, 351, 358
See application file for complete search history.

(56) References Cited

U.S. PATENT DOCUMENTS

| | | | |
|---|---|---|---|
| 3,766,906 A | * | 10/1973 | Jenn ................... F24C 15/2042 126/299 R |
| 4,160,407 A | * | 7/1979 | Duym ................... B08B 15/023 126/299 R |
| 4,273,406 A | | 6/1981 | Okagami |
| 4,370,703 A | | 1/1983 | Risberg |
| 4,563,731 A | | 1/1986 | Sato et al. |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Gregory Huson
*Assistant Examiner* — Dana Tighe
(74) *Attorney, Agent, or Firm* — Haverstock & Owens LLP

(57) ABSTRACT

An energy-efficient ventilation system comprises a ventilation fan, ductwork, system controller, and a plurality of ventilation points, each comprising a damper, a differential pressure sensor, a ventilation point controller, and a fume detector. When a ventilation point does not require ventilation, a signal is sent to the system controller to reduce the ventilation fan speed thereby using only as much energy as is needed to provide service to the ventilation points that need ventilation. The fume detector, damper, and differential pressure sensor for each ventilation point are used to determine whether ventilation is needed at a ventilation point and to control the ventilation point accordingly.

20 Claims, 8 Drawing Sheets

(56) References Cited

U.S. PATENT DOCUMENTS

| | | | |
|---|---|---|---|
| 4,645,278 A | 2/1987 | Yevak et al. | |
| 4,706,553 A * | 11/1987 | Sharp | B08B 15/023 454/61 |
| 4,712,160 A | 12/1987 | Sato et al. | |
| 4,788,626 A | 11/1988 | Neidig et al. | |
| 4,806,110 A | 2/1989 | Lindeman | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | |
| 4,899,256 A | 2/1990 | Sway-Tin | |
| 4,901,069 A | 2/1990 | Veneruso | |
| 5,065,302 A | 11/1991 | Kanazawa | |
| 5,090,919 A | 2/1992 | Tsuji | |
| 5,092,227 A * | 3/1992 | Ahmed | B08B 15/023 454/340 |
| 5,101,322 A | 3/1992 | Ghaem et al. | |
| 5,126,931 A | 6/1992 | Jitaru | |
| 5,132,890 A | 7/1992 | Blandino | |
| 5,139,009 A * | 8/1992 | Walsh | F24C 15/2021 126/299 D |
| 5,205,783 A * | 4/1993 | Dieckert | F24F 7/08 454/238 |
| 5,235,491 A | 8/1993 | Weiss | |
| 5,325,283 A | 6/1994 | Farrington | |
| 5,365,403 A | 11/1994 | Vinciarelli et al. | |
| 5,373,432 A | 12/1994 | Vollin | |
| 5,434,768 A | 7/1995 | Jitaru et al. | |
| 5,442,540 A | 8/1995 | Hua | |
| 5,673,185 A | 9/1997 | Albach et al. | |
| 5,712,772 A | 1/1998 | Telefus et al. | |
| 5,764,579 A * | 6/1998 | McMasters | B08B 15/023 454/340 |
| 5,786,992 A | 7/1998 | Vinciarelli et al. | |
| 5,790,395 A | 8/1998 | Hagen | |
| 5,811,895 A | 9/1998 | Suzuki et al. | |
| 5,838,554 A | 11/1998 | Lanni | |
| 5,859,771 A | 1/1999 | Kniegl | |
| 5,905,369 A | 5/1999 | Ishii et al. | |
| 5,923,543 A | 7/1999 | Choi | |
| 5,949,672 A | 9/1999 | Bertnet | |
| 5,978,238 A | 11/1999 | Liu | |
| 6,009,008 A | 12/1999 | Pelly | |
| 6,091,611 A | 7/2000 | Lanni | |
| 6,183,302 B1 | 2/2001 | Daikuhara et al. | |
| 6,191,957 B1 | 2/2001 | Peterson | |
| 6,272,015 B1 | 8/2001 | Mangtani | |
| 6,275,397 B1 | 8/2001 | McClain | |
| 6,307,761 B1 | 10/2001 | Nakagawa | |
| 6,323,627 B1 | 11/2001 | Schmiederer et al. | |
| 6,356,465 B2 | 3/2002 | Yasumura | |
| 6,366,476 B1 | 4/2002 | Yasumura | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,452,816 B2 | 9/2002 | Kuranki | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,578,253 B1 | 6/2003 | Herbert | |
| 6,721,192 B1 | 4/2004 | Yang et al. | |
| 6,739,967 B2 * | 5/2004 | Saito | B08B 15/002 454/56 |
| 6,775,162 B2 | 8/2004 | Mihai et al. | |
| 6,890,252 B2 * | 5/2005 | Liu | B08B 15/002 454/27 |
| 6,894,461 B1 | 5/2005 | Hack et al. | |
| 6,914,532 B2 * | 7/2005 | Crooks | F24F 11/0086 340/506 |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1 | 7/2007 | Hsu et al. | |
| 7,274,175 B2 | 9/2007 | Manolescu | |
| 7,275,533 B2 * | 10/2007 | Soeholm | F23N 3/002 126/299 R |
| 7,315,460 B2 | 1/2008 | Kyono | |
| 7,386,286 B2 | 6/2008 | Petrovic et al. | |
| 7,450,388 B2 | 11/2008 | Beihoff et al. | |
| 7,564,706 B1 | 7/2009 | Herbert | |
| 7,596,007 B2 | 9/2009 | Phadke | |
| 7,701,305 B2 | 4/2010 | Lin et al. | |
| 7,830,684 B2 | 11/2010 | Taylor | |
| 7,924,578 B2 | 4/2011 | Jansen et al. | |
| 8,059,434 B2 | 11/2011 | Huang et al. | |
| 8,102,678 B2 | 1/2012 | Jungreis | |
| 8,125,181 B2 | 2/2012 | Gregg et al. | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,194,417 B2 | 6/2012 | Chang | |
| 8,207,717 B2 | 6/2012 | Urono et al. | |
| 8,243,472 B2 | 8/2012 | Chang et al. | |
| 8,344,689 B2 | 1/2013 | Boguslavskij | |
| 8,369,111 B2 | 2/2013 | Balakrishnan et al. | |
| 8,400,801 B2 | 3/2013 | Shinoda | |
| 2001/0036091 A1 | 11/2001 | Yasumura | |
| 2002/0008963 A1 | 1/2002 | Dibene et al. | |
| 2002/0011823 A1 | 1/2002 | Lee | |
| 2002/0036200 A1 | 3/2002 | Ulrich et al. | |
| 2003/0035303 A1 | 2/2003 | Balakrishnan et al. | |
| 2003/0112645 A1 | 6/2003 | Schlecht | |
| 2004/0088082 A1 * | 5/2004 | Ahmed | G05B 15/02 700/276 |
| 2004/0183510 A1 | 9/2004 | Sutardja et al. | |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1 | 11/2005 | Reinhard et al. | |
| 2006/0002155 A1 | 1/2006 | Shteynberg et al. | |
| 2006/0022637 A1 | 2/2006 | Wang et al. | |
| 2006/0152947 A1 | 7/2006 | Baker et al. | |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0087784 A1 | 4/2007 | Yamamoto et al. | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0202795 A1 * | 8/2007 | Seliger | B08B 15/002 454/155 |
| 2007/0242487 A1 | 10/2007 | Orr | |
| 2007/0247091 A1 | 10/2007 | Maiocchi | |
| 2007/0263415 A1 | 11/2007 | Jansen et al. | |
| 2008/0018265 A1 | 1/2008 | Lee et al. | |
| 2008/0043496 A1 | 2/2008 | Yang | |
| 2008/0191667 A1 | 8/2008 | Kernahan et al. | |
| 2009/0034299 A1 | 2/2009 | Lev | |
| 2009/0045889 A1 | 2/2009 | Goergen et al. | |
| 2009/0196073 A1 | 8/2009 | Nakahori | |
| 2009/0207637 A1 | 8/2009 | Boeke | |
| 2009/0290384 A1 | 11/2009 | Jungreis | |
| 2009/0300400 A1 | 12/2009 | DuBose | |
| 2010/0039833 A1 | 2/2010 | Coulson et al. | |
| 2010/0289466 A1 | 11/2010 | Telefus et al. | |
| 2010/0317216 A1 | 12/2010 | Pocrass | |
| 2010/0322441 A1 | 12/2010 | Weiss et al. | |
| 2011/0132899 A1 | 6/2011 | Shimomugi et al. | |
| 2011/0211376 A1 | 9/2011 | Hosotani | |
| 2011/0261590 A1 | 10/2011 | Liu | |

(56) References Cited

U.S. PATENT DOCUMENTS

2011/0284091 A1\* 11/2011 Livchak .............. F24C 15/2021
  137/2
2012/0112657 A1   5/2012 Van Der Veen et al.
2012/0113686 A1   5/2012 Telefus et al.

OTHER PUBLICATIONS

EE Times. com—"Wireless Beacon Could Recharge Consumer Devices", by R. Colin Johnson, 3 pages, Nov. 6, 2007.
Novel Zero-Voltage and Zero-Current Switching (ZVZCS) Full Bridge PWM converter Using Coupled Output Inductor, Sep. 2002 IEEE, pp. 641-648.
"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.
"Randomized Modulation in Power Electronic Converters". Aleksander M. Stankovic, member IEEE, and Hanoch Lev-Ari, vol. 90, No. 5, May 2002, pp. 782-799.
"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

\* cited by examiner

ENERGY SAVING-EXHAUST CONTROL AND AUTO SHUT OFF SYSTEM

RELATED APPLICATIONS

This non-provisional patent application claims the benefit of priority under 35 U.S.C. §119(e) of the U.S. provisional Patent Application Ser. No. 61/721,899, filed on Nov. 2, 2012, entitled "ENERGY SAVING-EXHAUST CONTROL AND AUTO SHUT OFF SYSTEM", which is incorporated by reference in its entirety.

FIELD OF THE INVENTION

The present invention relates to the field of HVAC and equipment exhaust ventilation control and energy saving ventilation methods. More specifically, the present invention relates to reducing energy used by an HVAC and equipment exhaust ventilation control system by maintaining only the constant flow rate necessary for the exhaust ventilation demand and automatically shutting down the equipment when appropriate.

BACKGROUND OF THE INVENTION

Ventilation is the process of replacing air within a space. The process of replacing air includes both the removal of air from within the space and replacement of the air removed from the space. In most residential and industrial environments, both the removal and replacement of air are performed by mechanical means. Most often, the mechanical means comprise a heating, ventilating, and air conditioning (HVAC) unit. The HVAC unit supplies air to a space by a forced air system using a fan. Many industrial systems remove air from a space by using an exhaust system that removes, but does not recirculate, air because the removed air is presumed to contain unhealthy or toxic fumes. Accordingly, a second fan system is used for exhausting air that is separate from the fan system that supplies air to the space. Because an industrial work space may contain equipment that generates unhealthy or toxic fumes into the air within the space, exhaust systems are often over-designed to facilitate rapid removal of harmful air from the industrial work space. Over-design of a ventilation system can include the providing of larger diameter ducts than are needed and larger fans to draw the over-designed air capacity out of the work space. Over-design of the exhaust system also typically means that a correspondingly over-designed air supply and exhaust system is also used. The over-design, alone, is inefficient and wastes energy. In addition, when fume-generating equipment is not operated or requires less ventilation than provided by the over-designed ventilation system, the ventilation system is even more inefficient and wastes energy. Current energy efficiency techniques focus on the generation of recovery of heat rather than increasing the efficiency of the ventilation process. In some applications, one ventilation system is shared with several fume-generating pieces of equipment and the flow rate of each equipment ventilation exhaust point is not controlled properly and affects each other during adjustment. Also, equipment closer to the ventilation system core experiences more suction forces.

SUMMARY OF THE INVENTION

The presently claimed invention solves the inefficiencies of the prior art ventilation systems by reducing the energy used for exhaust ventilation in response to detecting a reduction of the need for exhaust ventilation at one or more exhaust ventilation points. A work space contains fume-generating equipment and an exhaust ventilation point to remove the fumes generated by the equipment. When the equipment is not operating, a ventilation damper in the exhaust ventilation point is closed, and a ventilation force generated by an exhaust fan is reduced, thereby saving energy as well as reducing maintenance for the HVAC system due to reduced loading. In addition, the ventilation damper can be interlocked with an ON/OFF switch associated with the equipment such that the ventilation damper is opened when the equipment is turned ON, and the damper is closed when the equipment is turned OFF. A differential pressure sensor detects air flow across the ventilation damper and the flow rate data is fed back to a control unit for adjusting the damper position by the switch to achieve the desired flow rate requirement. A safety action can be taken if ventilation is not detected when a piece of equipment is turned ON. A safety action can comprise forcing the equipment to an OFF state, issuing an alarm, and other remedial actions described herein.

In a first aspect, a method of increasing the efficiency of an exhaust ventilation system is practiced on an exhaust ventilation system that comprises an exhaust ventilation fan that generates a ventilating force in an exhaust ventilation duct, an exhaust ventilation system controller, and a plurality of exhaust ventilation points coupled to the exhaust ventilation duct. Each exhaust ventilation point has an exhaust ventilation load, a controllable damper, a differential pressure sensor, an equipment ON/OFF switch operably coupled to a piece of equipment that is ventilated by the exhaust ventilation point, and an exhaust ventilation point controller coupled to the controllable damper, the differential pressure sensor, and the ON/OFF switch. The method comprises reducing, by the exhaust ventilation system controller, the ventilation force generated by the exhaust ventilation fan in response to detecting a reduction in the exhaust ventilation load of at least one exhaust ventilation point. Detecting a reduction in the exhaust ventilation load of at least one exhaust ventilation point comprises detecting that the controllable damper of the at least one exhaust ventilation point has closed. In some embodiments, detecting a reduction in the exhaust ventilation load of at least one exhaust ventilation point comprises detecting that the differential pressure across the controllable damper of the at least one exhaust ventilation point indicates that the controllable damper has closed. Detecting a reduction in the exhaust ventilation load of at least one exhaust ventilation point can alternatively comprise detecting that the ON/OFF switch for the piece of equipment that is ventilated by the at least one exhaust ventilation point has changed to the OFF position. In such embodiments, the method can further comprise delaying the detecting of the reduction in the exhaust ventilation load for a predetermined period of time after detecting that the ON/OFF switch has been changed to the OFF position. Preferably, the at least one exhaust ventilation point further comprises a fume detector coupled to the exhaust ventilation point controller, and detecting a reduction in the exhaust ventilation load of the at least one exhaust ventilation point further comprises determining that fumes detected by the fume detector are below a predetermined threshold value. In some embodiments, detecting a reduction in the exhaust ventilation load of the at least one exhaust ventilation point further comprises determining that fumes detected by the fume detector have remained below a predetermined threshold value for a first predetermined period of time. Detecting a reduction in the exhaust ventilation load of the at least one exhaust ventilation point can further comprise the exhaust ventilation point controller determining that fumes detected by the fume detector have remained below a predetermined threshold value for a second predetermined period of time, shorter than the first predetermined period time, during a window of time that the equipment is scheduled for non-operation.

In a second aspect, a non-transitory computer-readable medium is programmed with processor-executable instructions that, when executed, implement any of the above methods.

In a third aspect, a system for increasing the efficiency of an exhaust ventilation of an area comprises an exhaust ventilation system controller and an exhaust ventilation fan coupled to a system of duct work and to the exhaust ventilation system controller. The exhaust ventilation fan generates an exhaust ventilation force in the system of duct work. The system further comprises a plurality of exhaust ventilation points coupled to the system of duct work. Each exhaust ventilation point has an exhaust ventilation load for a piece of equipment, each piece of equipment has an ON/OFF switch, and each exhaust ventilation point further comprises an exhaust ventilation point controller communicatively coupled to the exhaust ventilation system controller and coupled to the ON/OFF switch of the piece of equipment ventilated by the exhaust ventilation point. Each exhaust ventilation point also has a damper coupled to the system of duct work and coupled to the exhaust ventilation point controller, and a differential pressure sensor coupled to the exhaust ventilation point controller. The exhaust ventilation system controller is configured to reduce the exhaust ventilation force generated by the exhaust ventilation fan in response to detecting a reduction in the exhaust ventilation load for at least one of the plurality of exhaust ventilation points. In a preferred embodiment, detecting a reduction in the exhaust ventilation load of at least one exhaust ventilation point comprises detecting that the controllable damper of the at least one exhaust ventilation point has been closed. In some embodiments, detecting a reduction in the exhaust ventilation load of the at least one exhaust ventilation points comprises detecting that the ON/OFF switch for the piece of equipment that is ventilated by the at least one exhaust ventilation point has changed to the OFF position. In such embodiments, preferably the exhaust ventilation point controller is further configured to delay the reduction in the exhaust ventilation force for a predetermined period of time after detecting that the ON/OFF switch has been changed to the OFF position. Also preferably, the exhaust ventilation point damper is closed after expiration of the predetermined period of time. In further preferred embodiments, each exhaust ventilation point further comprises a fume detector coupled to the exhaust ventilation point controller, the controller is configured to detect a reduction in the exhaust ventilation load of the at least one exhaust ventilation point and is further configured to determine that fumes detected the fume detector are below a predetermined threshold value. In some embodiments, the exhaust ventilation point controller is further configured to determine that fumes detected by the fume detector have remained below a predetermined threshold value for a first predetermined period of time. In such embodiments, preferably the exhaust ventilation point controller is further configured to determine that fumes detected by the fume detector have remained below a predetermined threshold value for a second predetermined period of time that is shorter than the first period of time, during a window of time that the equipment is scheduled for non-operation such as weekends, holidays, and nights. In some embodiments, the exhaust ventilation system controller comprises the plurality of exhaust ventilation point controllers. In another preferred embodiment, each exhaust ventilation point further comprises an alarm coupled to the exhaust ventilation point controller and the exhaust ventilation controller is configured to actuate the alarm upon detection by the exhaust ventilation controller of an alarm condition. In some embodiments, an alarm condition comprises one of: the fume detector detecting fumes above a predetermined fume threshold when the air flow detected by the differential pressure sensor is below a predetermined air flow threshold; detecting that the damper is in the open and the air flow is below a predetermined air flow threshold; and that the equipment ON/OFF switch is in the ON position and the air flow is below a predetermined air flow threshold.

DETAILED DESCRIPTION OF THE DRAWINGS

In the detailed description of the drawings that follows, the embodiments described are intended to illustrate features of the presently claimed invention. Similar labels refer to similar or identical elements. Air flow rate characteristics have been described in terms of pressure, in pounds per square inch (PSI), in conjunction with a differential pressure sensor and a controllable damper. One skilled in the art will recognize that the air flow characteristics could also be described in terms of cubic feet per minute (CFM) in conjunction with an air flow meter to implement the claimed invention.

Figure 1:
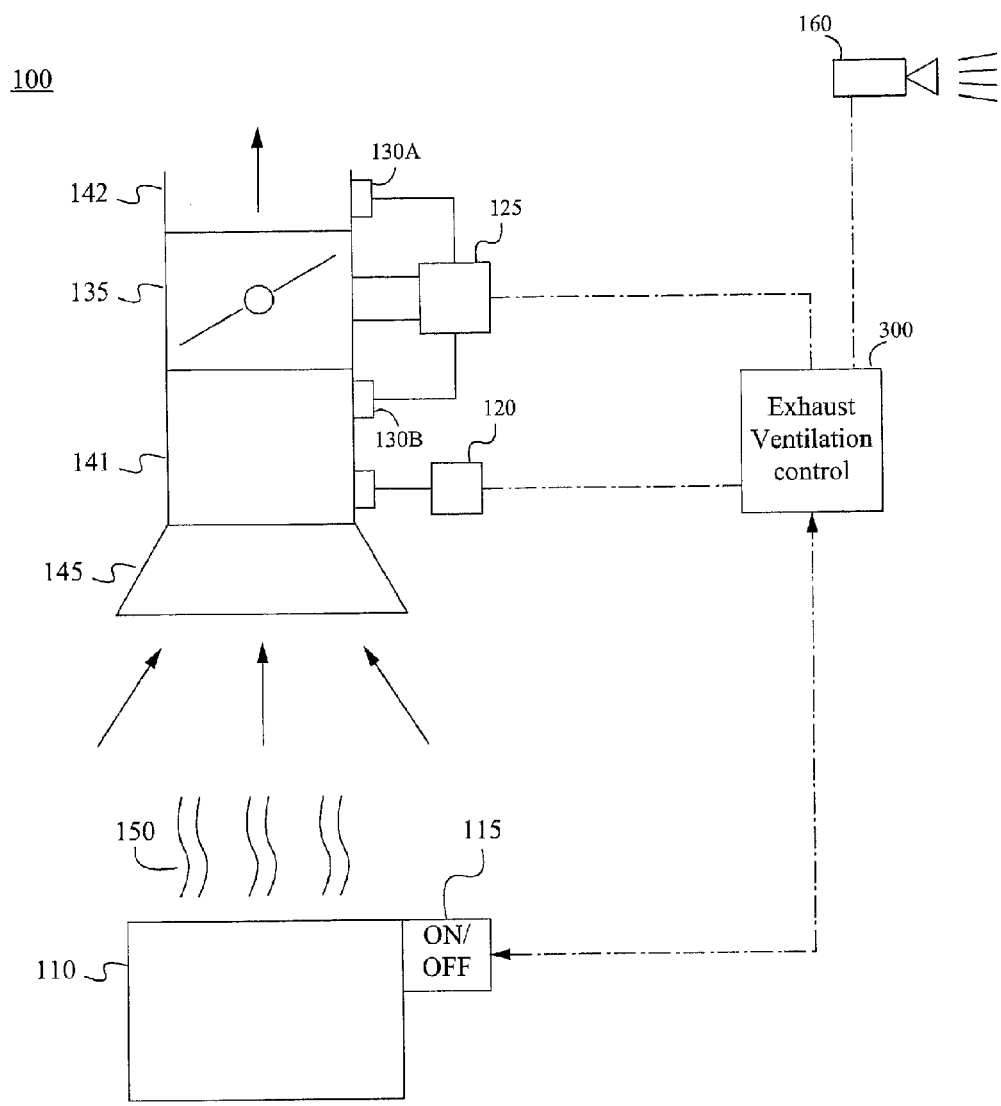
FIG. 1 illustrates the elements of an exhaust ventilation point according to some embodiments.

FIG. 1 illustrates the elements of an exhaust ventilation point 100 according to some embodiments. A piece of equipment 110 comprises an ON/OFF switch 115 that is coupled to an exhaust ventilation point controller 300. An exhaust ventilation point 100 comprises an exhaust ventilation entry point 145 coupled to a lower exhaust ventilation duct 141. A fume detector 120 is mechanically and fluidly coupled to the lower exhaust ventilation duct 141 and is further communicatively coupled to the exhaust ventilation point controller 300. One skilled in the art will recognize that the fume detector 120 could alternatively be coupled to the upper exhaust ventilation duct 142 or within a controllable damper 135. The fume detector 120 can be selected for the type of fumes 150 that will be generated by the piece of equipment 110. If no single detector 120 can detect the variety of fumes that are produced by operation of the piece of equipment 110, then a plurality of detectors 120 can be combined with appropriate logic to provide the exhaust ventilation point controller 300 with appropriate signals to generate alarms that are appropriate or required for the fume types generated at the equipment 110. One or more alarms 160 are operably coupled to the exhaust ventilation point controller 300. The controllable damper 135 couples the lower exhaust ventilation duct 141 and the upper exhaust ventilation duct 142. The controllable damper 135 is further communicatively coupled to the exhaust ventilation point controller 300. As described in FIG. 3, below, the exhaust ventilation point controller 300 is configured to control an ON/OFF switch of a damper motor turning direction either clockwise or counter-clockwise and to control the position of the damper 135. A differential pressure sensor 125 comprises a first pressure sensing point 130A and a second pressure sensing point 130B. The first pressure sensing point 130A is coupled to the outside of the of the upper exhaust ventilation duct 142 (or alternatively the outside of the lower exhaust ventilation duct 141) and the second pressure sensing point 130B is coupled to the inside of the lower exhaust ventilation duct 141. In this exemplary implementation, a differential pressure between the inside and outside of the lower exhaust ventilation duct 141 is measured to calculate the flow rate. The differential pressure sensor 125 is further communicatively coupled to the exhaust ventilation point controller 300.

Figure 2:
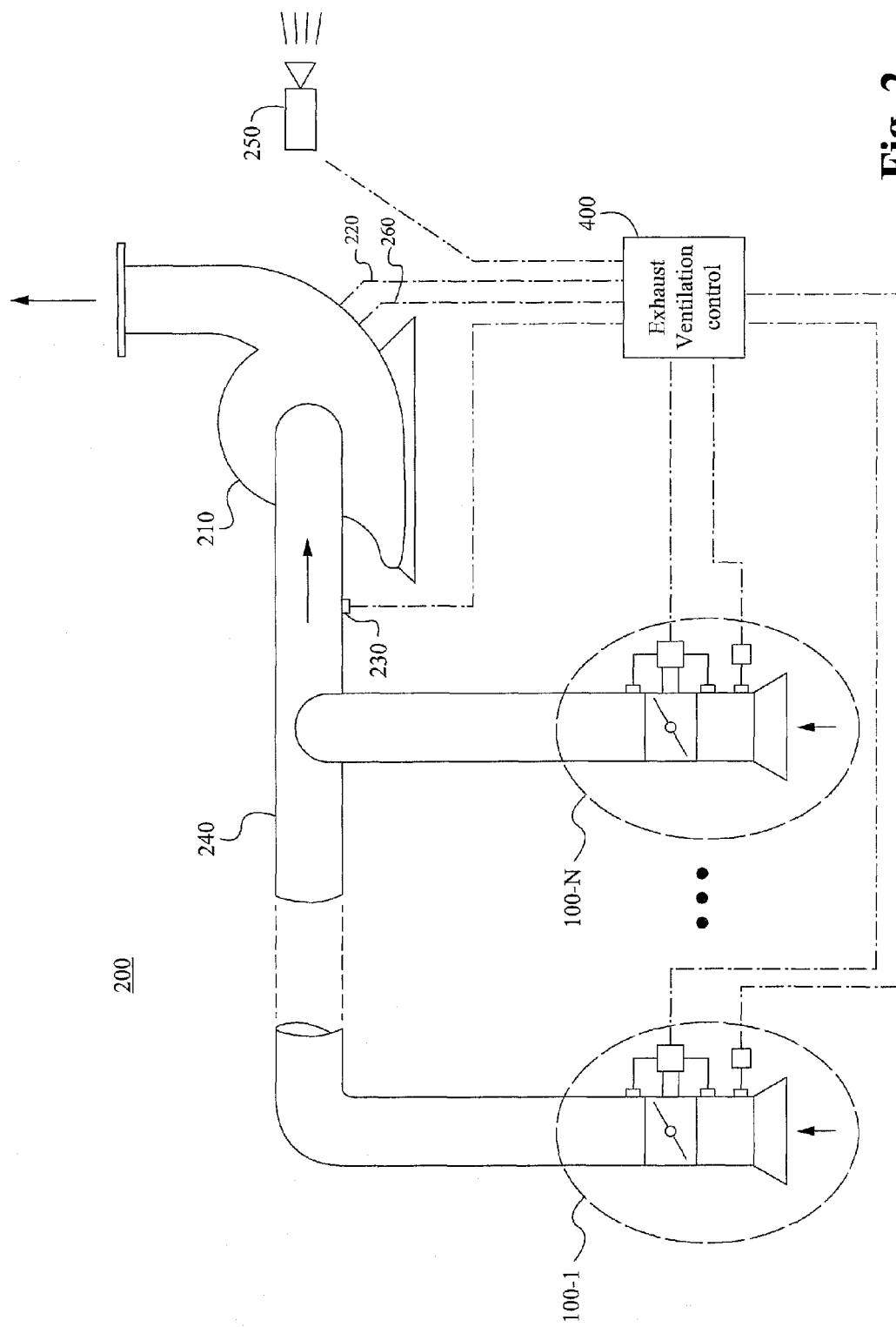
FIG. 2 illustrates an exhaust ventilation system comprising a plurality of exhaust ventilation points according to some embodiments.

FIG. 2 illustrates an exhaust ventilation system 200 comprising a plurality of exhaust ventilation points 100-1 through 100-N according to some embodiments. In FIG. 2, an arbitrary one of the exhaust ventilation points 100-1 through 100-N is referred to as 100-X for simplicity. Each exhaust ventilation point 100-X is substantially identical to the exhaust ventilation point 100 of FIG. 1 with the exception of any special fume detector types 120-X as may be necessary for the equipment 110-X being ventilated and the sizing of the ductwork and differential pressure sensor range that is determined by the ventilation requirements of a particular exhaust ventilation point. The exhaust ventilation system 200 comprises exhaust ventilation points 100-1 through 100-N coupled to a system of ductwork 240, an exhaust ventilation system air flow sensor 230, an exhaust ventilation fan 210 having exhaust ventilation fan speed control line 220 and a fan speed sensor line 260, one or more alarm devices 250, and an exhaust ventilation system controller 400, described below in FIG. 4.

Figure 3:
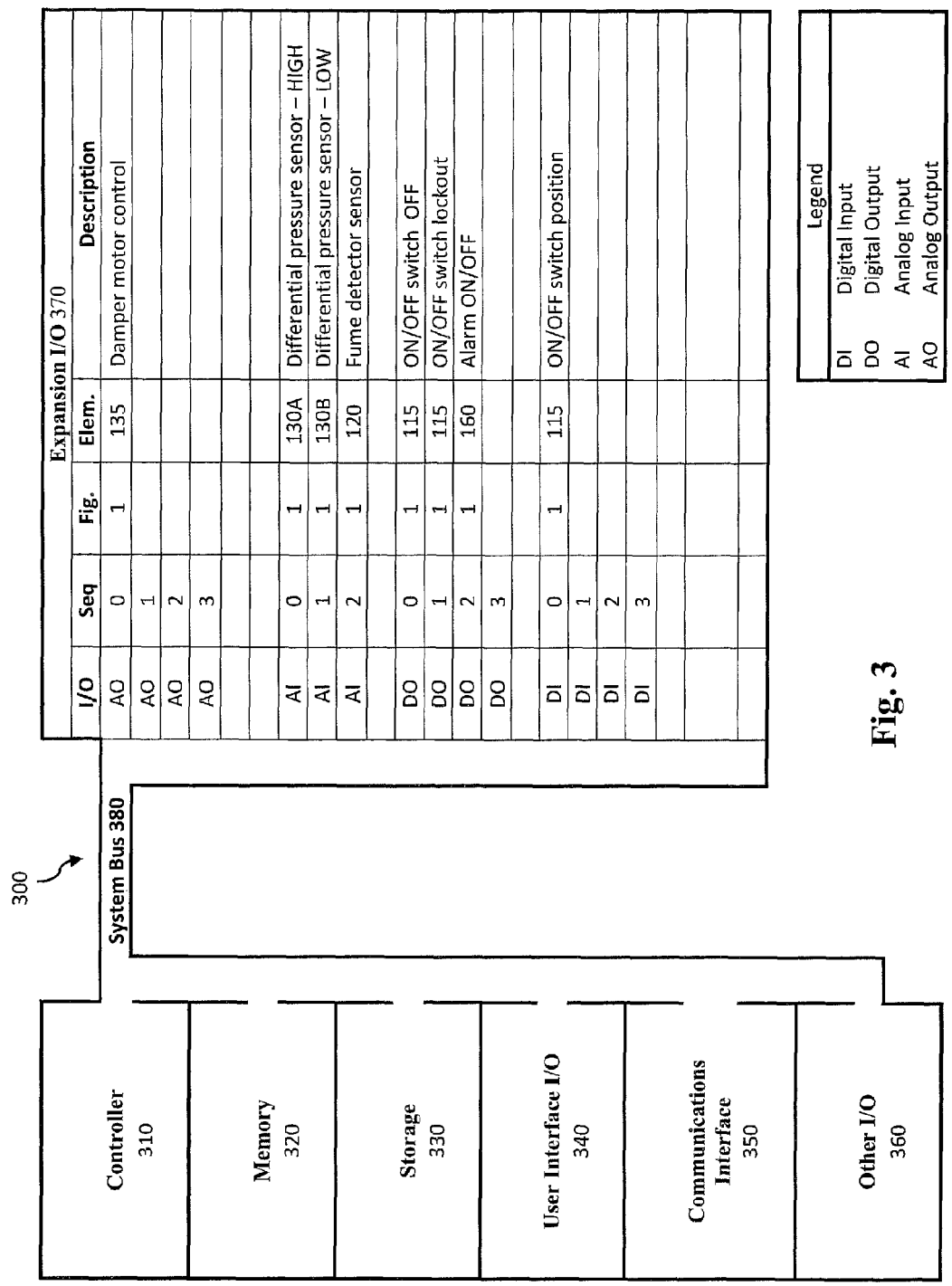
FIG. 3 illustrates an exhaust ventilation controller system according to some embodiments.

FIG. 3 illustrates an exhaust ventilation point controller 300 for controlling an exhaust ventilation point 100 according to some embodiments. The exhaust ventilation point controller 300 is configured to monitor and control a single exhaust ventilation point 100, as described in FIG. 1, above. The exhaust ventilation point controller 300 comprises a controller 310, a memory 320, a storage 330, a user interface I/O subsystem 340, a communications interface 350, other I/O 360, and expansion I/O 370 all coupled to a system bus 380. The controller 310 can be a microprocessor, a programmable logic controller (PLC), a general purpose processor, a microcomputer, or the like. The memory 320 is a read/write memory as is known in the art, including static RAM, dynamic RAM, flash memory, or high-speed cache memory. The storage 330 comprises bulk storage, preferably non-volatile storage, such as a hard disk, flash memory, read/write CD-ROM, or battery-backed RAM. Programs and data will typically be stored in the storage 330 and loaded into the memory 320 for execution. The user interface I/O subsystem 340 can comprise an I/O interface to a user interface device such as a keyboard and computer monitor, a touch screen, a terminal, or other user interface I/O subsystems. The communications interface 350 can comprise any conventional communications protocol such as RS232, RS485, ethernet, I²C, clocked serial I/O, or USB protocols. The expansion I/O 370 comprises digital and analog inputs and outputs. Analog outputs comprise an analog output to control the position of the damper 135. Analog inputs comprise an input to detect the HIGH and LOW sensors of a differential pressure sensor, and to detect the output of the fume detector 120. Digital outputs comprise an equipment ON/OFF switch position control, an equipment ON/OFF switch position lockout, and an alarm ON/OFF signal. Digital inputs comprise an equipment ON/OFF switch position sensor. One skilled in the art will recognize that other means for asserting and monitoring control, such as by messaging via the communications interface 350, are possible within the scope of this disclosure. Methods of operating the exhaust ventilation point controller 300 are described in the method flow charts below.

Figure 4:
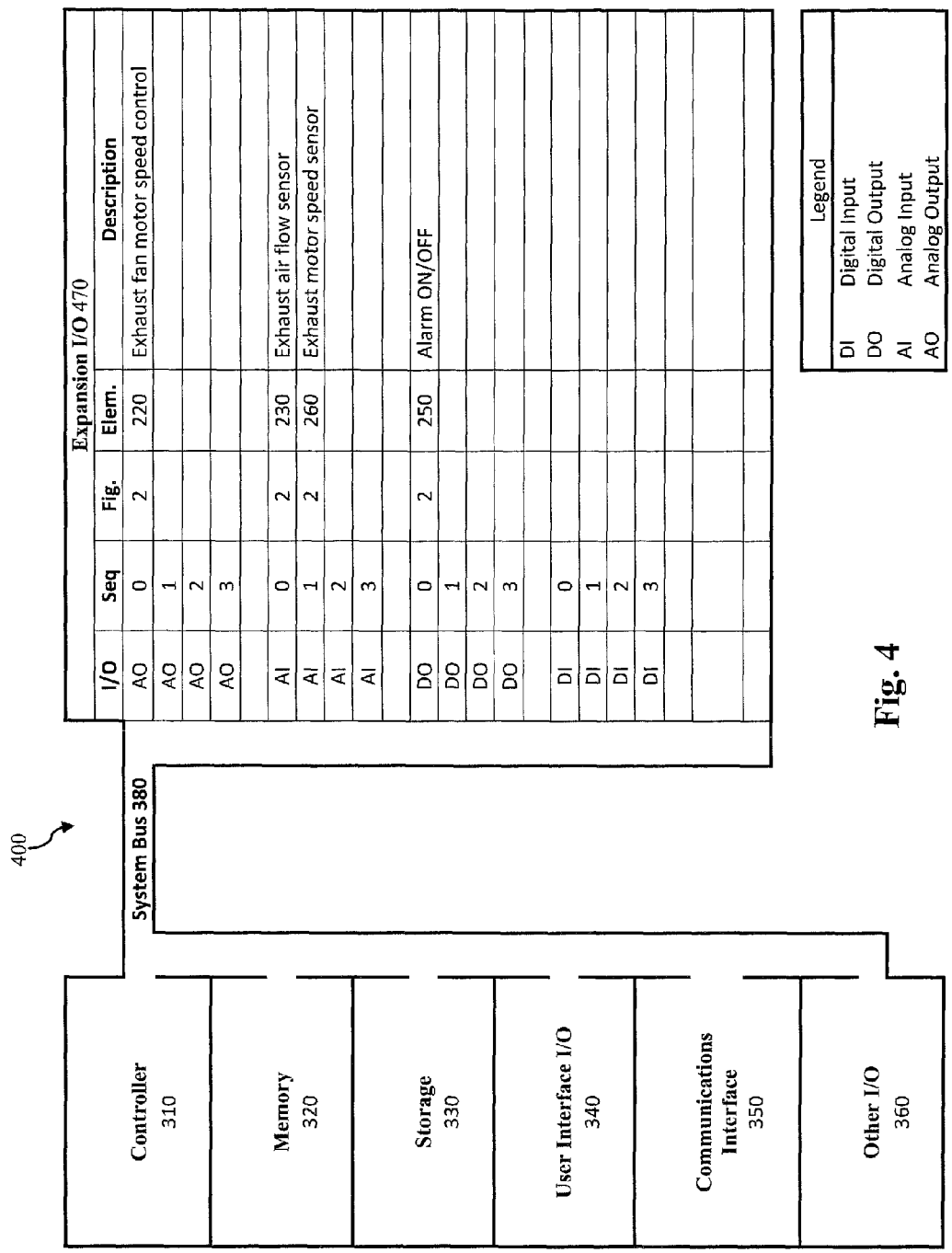
FIG. 4 illustrates an exhaust ventilation system controller of an exhaust ventilation system according to some embodiments.

FIG. 4 illustrates an exhaust ventilation system controller 400 of an exhaust ventilation system 200 according to some embodiments. An exhaust ventilation system controller 400 comprises substantially the same subsystems as the exhaust ventilation point controller 300, above with the exception of the mapping of the Expansion I/O 470, the usage of the communications interface 350, and other I/O 360. The Expansion I/O 470 comprises an analog output to control the speed of a motor of the exhaust ventilation fan 210 and an analog input to detect the speed of the exhaust ventilation fan motor. Analog input further comprises a signal from an input from an air flow sensor to detect the air flow in the exhaust ventilation ductwork 240. The exhaust fan speed can alternatively be read via a timer/counter interrupt within the Other I/O 360. Digital output comprises an alarm output for system-wide alarms. The exhaust ventilation system controller 400 can communicate with the exhaust ventilation point controllers via communications interface 350 that supports the same types of communications described in FIG. 3, above.

Figure 5:
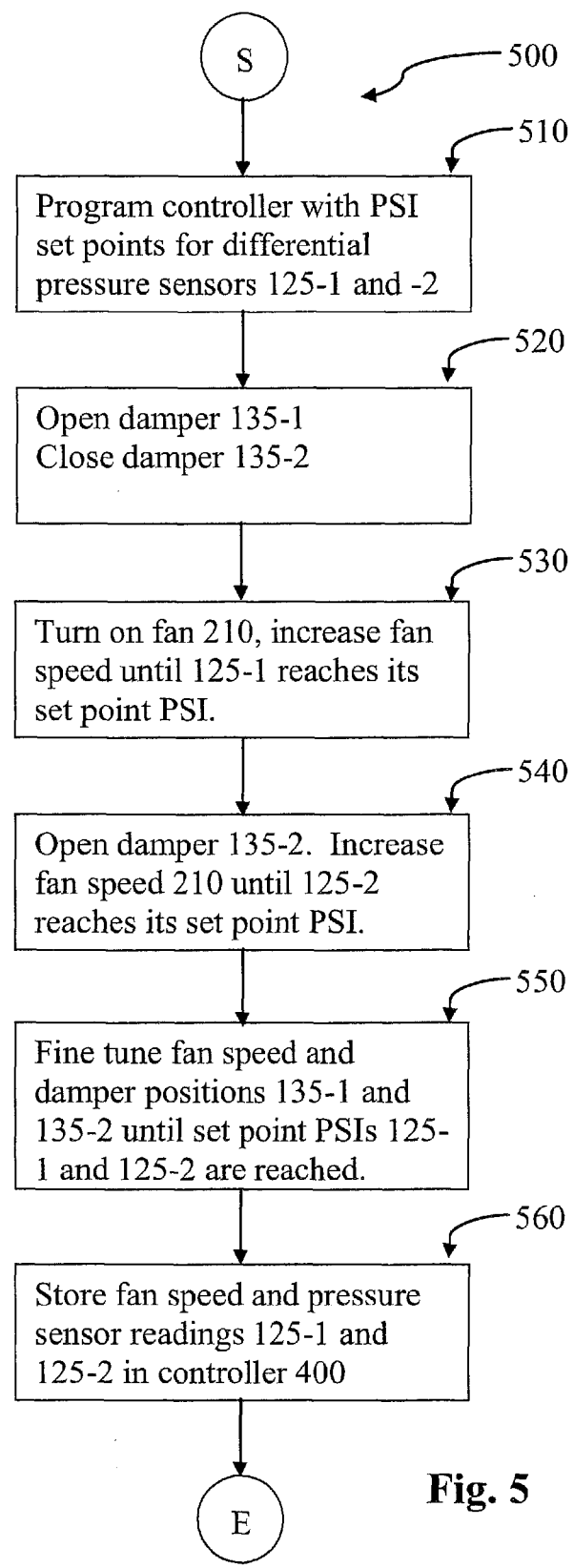
FIG. 5 illustrates the steps of a method of initially load balancing an exhaust ventilation system according to some embodiments.

FIG. 5 illustrates the steps of a method 500 of initially load balancing an exemplary exhaust ventilation system 200 that comprises two exhaust ventilation points 100-1 and 100-2. Each exhaust ventilation point 100-X is designed for a particular exhaust ventilation load produced by a particular piece of equipment 110-X. Referring to FIGS. 2, 3, and 5, the method 500 starts in the step 510, programming the specifications of each exhaust ventilation point 100-1 and 100-2 into the exhaust ventilation system controller 400. Alternatively, the specifications for each exhaust ventilation point 100-1 and 100-2 can be programmed into the exhaust ventilation point controllers 300-1 and 300-2, respectively, and transmitted to the exhaust ventilation system controller 400 as needed. Specifications include at least a set point PSI to be read from the differential pressure sensor 125-X when the damper 135-X is open. Further specifications can include the CFM of the design, calibration tables that relate the damper 135 positions to PSI readings of the differential pressure sensor 125-X, and meta data such as the location in the building where the exhaust ventilation point 100-X is located, the fume detector 120-X type, alarm 160-X type, etc. Specifically, at least the set point PSI reading of the differential pressure sensor 125-X when the damper 135-X is fully OPEN is stored. The specifications for each exhaust ventilation point 100-X will typically vary depending upon the exhaust ventilation requirements for each exhaust ventilation point 100-X, such as exhaust ventilation flow rate, exhaust ventilation fume type, the equipment type and capacity for generating fumes that require ventilating, proximity of other fume generating equipment, obstructions to air flow, and the like.

At step 520, the damper 135-1 is opened and the damper 135-2 is closed. At step 530, the exhaust ventilation system fan 210 is turned ON and its fan speed is increased until the differential pressure sensor 125-1 reaches its set point PSI. At step 540, the damper 135-2 is opened. By doing so, the exhaust ventilation system load is increased. Accordingly, at step 540, the fan speed is increased until the differential pressure sensor 125-2 reaches its set point PSI. At step 550, the fan 210 speed and damper positions 135-1 and 135-2 are fine tuned by a servo algorithm until the damper positions 135-1 and 135-2 and their associated differential pressure sensor readings 125-1 and 125-2 are stable at their respective set point PSI. The tuning operation is described in more detail below, under the heading, "System Fine Tuning/Servo Control", below. At step 560, the exhaust ventilation system controller 400 stores the fan 210 speed, differential pressure sensor readings 125-1 and 125-2. After step 560, the method ends.

Figure 6:
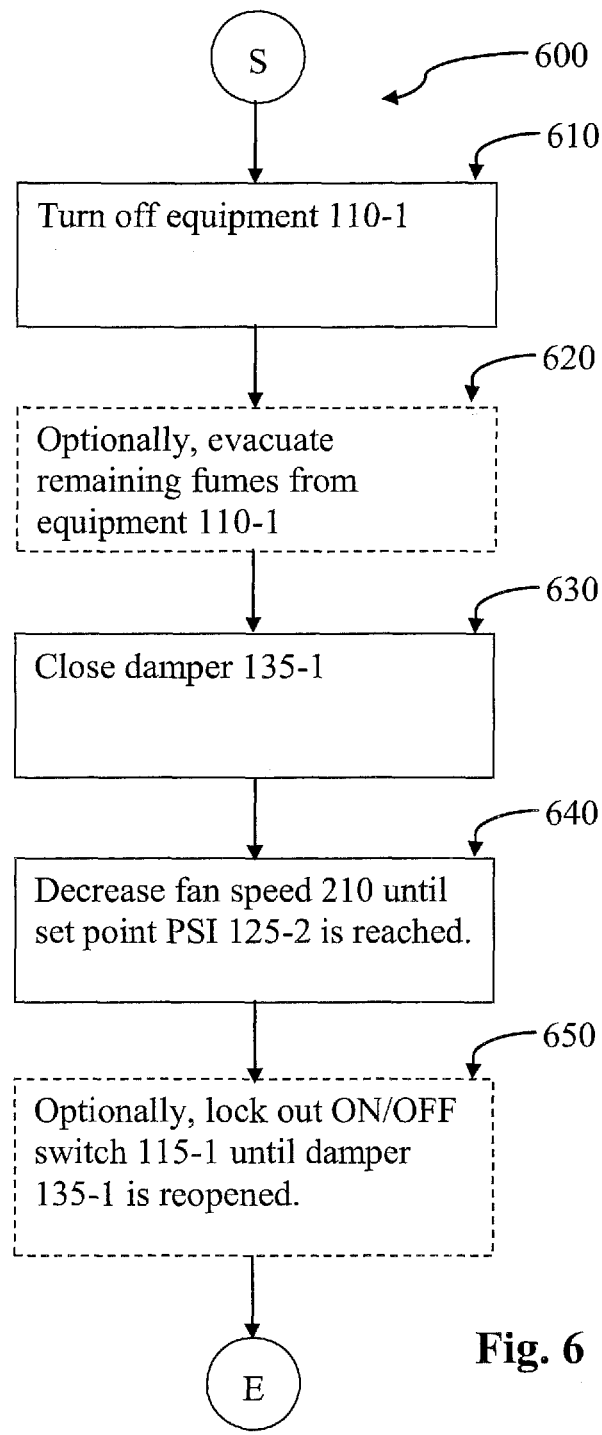
FIG. 6 illustrates the steps of a method of saving energy by reducing the load of an exhaust ventilation system according to some embodiments.

FIG. 6 illustrates the steps of a method 600 of saving energy by reducing the exhaust ventilation load of an exhaust ventilation system 200 according to some embodiments. This method again uses an example assumed system comprising two exhaust ventilation points 100-1 and 100-2. Energy saving will be described in reference to turning OFF the equipment at exhaust ventilation point 100-1. Referring to FIGS. 1, 2 and 6, at step 610, the equipment 110-1 is turned OFF. At step 620, an optional step of evacuating any remaining fumes at the equipment 110-1 is executed. Evacuating any remaining fumes at the equipment 110-1 can comprise continuing to operate the exhaust ventilation point 100-1 for a predetermined period of time. Alternatively, the exhaust ventilation point 100-1 can be operated until the fume detector 120-1 no longer detects fumes. At step 630, the damper 135-1 is closed. At step 640, the exhaust ventilation fan 210 speed is decreased until the set point PSI for differential pressure sensor 125-2 is reached. Optionally, at step 650, the ON/OFF switch 115-1 for the equipment 110-1 can be locked out until the damper 135-1 is re-opened. Energy is saved by reducing the exhaust ventilation fan 210 speed when ventilation is not required at the exhaust ventilation point 100-1.

Figure 7:
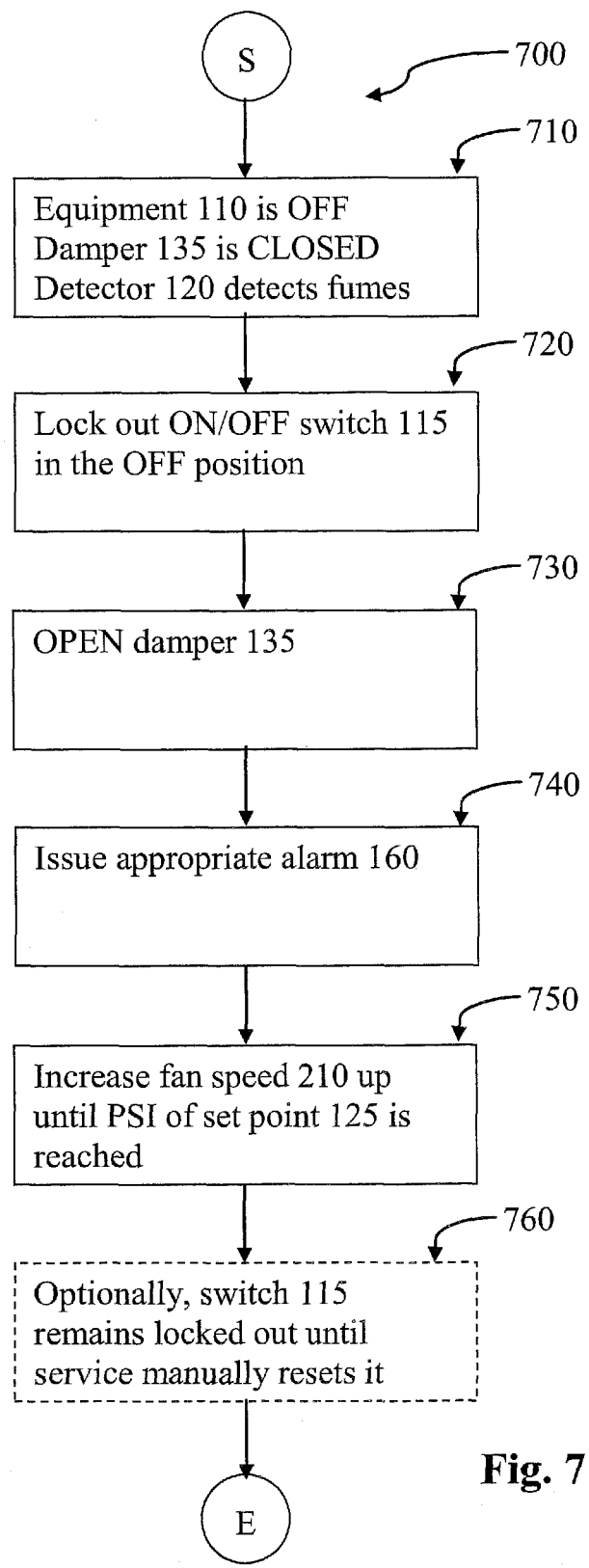
FIG. 7 illustrates the steps of a method of responding to an unexpected detection of fumes by an exhaust ventilation control system according to some embodiments.

FIG. 7 illustrates the steps of a method 700 of responding to an unexpected detection of fumes by an exhaust ventilation control system 200 according to some embodiments. The method can be operated on the exhaust ventilation system controller 400, or an exhaust ventilation point controller 300. The exhaust ventilation point controller 300 can issue an alarm locally and, in addition or alternatively, can send an alarm message to the exhaust ventilation system controller 400 for system-wide alarm processing. This method generates an alarm signal to the alarm 160 when fumes are unexpectedly detected by a fume detector 120, such as when equipment 110 is not operating and, therefore, the damper 135 is already closed. At step 710, the operating state of the exhaust ventilation point 100 is that the equipment 110 is OFF, the damper 135 is CLOSED, and the detector 120 has unexpectedly detected fumes. At step 720, the equipment ON/OFF switch 115 is locked in the OFF position. At step 730, the damper 135 is OPENED. At step 740, an alarm signal is generated to the alarm 160. As described above, the alarm signal can further comprise sending an alarm message to the exhaust ventilation system controller 400 for system-wide alarm processing. At step 750, after the damper 135 has opened, the exhaust ventilation fan 210 speed is increased until the differential pressure sensor 125 reads the PSI set point for this exhaust ventilation point 100. The PSI set point is stored in relation to the damper 135 being open, during the set-up and balancing method of FIG. 5. At step 760, optionally, the equipment ON/OFF switch 115 can be maintained locked in the OFF position until a service person manually resets the switch 115.

Figure 8:
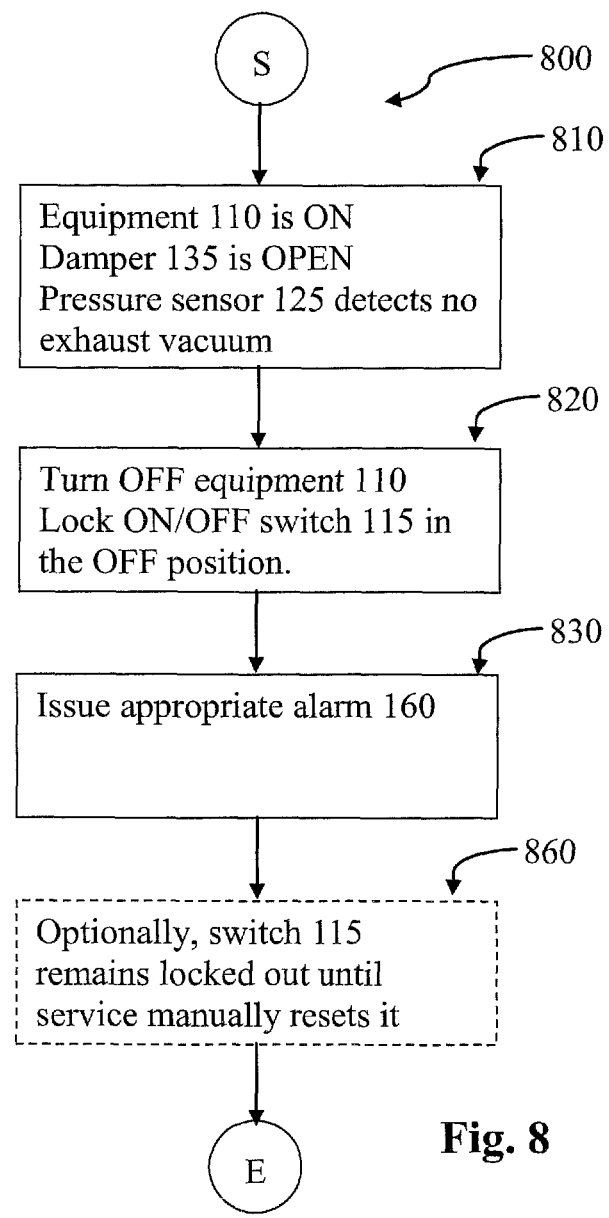
FIG. 8 illustrates the steps of a method of responding to an unexpected loss of exhaust ventilation force in an exhaust ventilation point according to some embodiments.

FIG. 8 illustrates the steps of a method 800 of responding to an unexpected loss of exhaust ventilation force in an exhaust ventilation point 100. At step 810, the equipment 110 is in the ON state, the damper 135 is OPEN, but the differential pressure sensor 125 detects no exhaust ventilation vacuum in the exhaust ventilation point 100. In this condition, personnel are at risk as fumes from the operating equipment 110 may accumulate and not be evacuated through the exhaust ventilation point 100. At step 820, the exhaust ventilation point controller 300 turns OFF the equipment 110 by switching the equipment ON/OFF switch 115 to the OFF position. The switching logic of the controller 300 can be implemented in series with the ON/OFF switch 115 to control operation of the operating equipment 110. Alternatively, the ON/OFF switch 115 can be controlled by logic in the controller 300 that overrides a manual operation of the ON/OFF switch 115. At step 830, an appropriate alarm signal is generated to the alarm 160 by the exhaust ventilation point controller 300. Additionally, the exhaust ventilation point controller 300 can send an alarm message to the exhaust ventilation system controller 400 for system-wide processing. At step 860, the equipment ON/OFF switch 115 can optionally be locked in the OFF position by the controller 300 until a service person manually resets the ON/OFF switch 115.

The method steps above are illustrative and not intended to be limiting. Some steps can be added, others deleted, and the steps can be performed in other orders.

System Fine Tuning/Servo Control

The systems and methods of exhaust ventilation disclosed herein are dynamic in nature. An exhaust ventilation fan 210 provides a vacuum force to a system of ductwork that interconnects a plurality of exhaust ventilation points. For example, referring to FIGS. 1 and 2, a damper 135 in an exhaust ventilation point 100 is opened in response to an equipment ON/OFF switch 115 being turn ON. When the damper is opened, the air flow across the open damper 135 will increase and the vacuum level within the ductwork, as measured at exhaust ventilation system air flow sensor 230 will decrease. Accordingly, to maintain the vacuum level within the ductwork that existed before the opening of the damper 135, the speed of the exhaust ventilation fan 210 motor must be increased until the vacuum level measured by the air flow sensor 230 is restored to its previous level.

However, restoring the vacuum level in the ductwork to its previous level may not be sufficient to ensure that the air flow measured at each exhaust ventilation point 100 is operating at its set point PSI. Each damper 135 may need to be individually adjusted slightly until the air flow rate measured at each exhaust ventilation point is operating substantially at its set point PSI and the vacuum sensor 230 in the ductwork is also measuring substantially at its vacuum set point. To accomplish this dynamic adjustment to the exhaust ventilation system, the exhaust ventilation system controller 400 monitors the vacuum level in the ductwork as measured by the air flow sensor 230 and each exhaust ventilation point controller 300 monitors the air flow rate at each exhaust ventilation point 100. The exhaust ventilation point controller 300 determines the air flow rate as a function of the pressure differential provided by the differential pressure sensor 125 and the dimensions of the ducts 141 and/or 142, as the flow rate varies depending on the duct dimensions.

The exhaust ventilation system controller 400 receives messages from the plurality of exhaust ventilation point controllers 300 that indicate, for each exhaust ventilation point 100, air flow rate, fume level detection, and ON/OFF switch state at that exhaust ventilation point 100. The exhaust ventilation system controller 400 then uses a fine tuning algorithm, such as a servo algorithm, to generate responsive messages to some or all of the plurality of exhaust ventilation point controllers 300. A responsive message to an exhaust ventilation point controller 300 includes an instruction for adjusting the position of the damper 135 to effect a change in the air flow. An instruction for adjusting the position of the damper can comprise an instruction that no adjustment is needed to the damper position. A servo algorithm can be any servo algorithm now known or later developed, such as the proportional, integral, derivative gain (PID) algorithm known in the art. In operation, overall exhaust ventilation system air flow, and the air flow at each exhaust ventilation point, is controlled by a closed-loop feedback technique, such as a servo algorithm. One skilled in the art will recognize that each exhaust ventilation point controller 300 could, alternatively, servo the damper it controls to achieve the set point PSI for that exhaust ventilation point.

Fume Detection

Fume detection can comprise detection of process by-products such as welding or soldering fumes that can contain metals, particulates and gases such as carbon dioxide ($CO_2$), carbon monoxide (CO), hydrogen fluoride (HF), nitric oxide (NO), and ozone ($O_2$). Fume detection can further include detecting automobile-related fumes such as carbon monoxide (CO), gasoline, and diesel fuel. Other fuel fume detection includes methane, propane and natural gas detection. Fume detection can further include chemicals such as chlorine gas, hydrogen sulfide, hydrogen, and formaldehyde.

Energy-Saving Reduction in Ventilation Force

Ventilation can comprise exhaust ventilation only, or both supply of ventilating air and exhaust of ventilation air. Some ventilating systems are designed with a common motor that drives both a supply fan and a corresponding exhaust fan. The presently claimed invention contemplates reducing the exhaust ventilating force in response to a reduced demand for an exhaust ventilation. In systems that use a single motor to drive both a supply fan and an exhaust fan, the ventilation supply air is inherently reduced by a reduction in exhaust fan ventilating force. A ventilating system can comprise its own motor control such that a single analog signal can be used to command the drive of the exhaust fan motor. Alternatively, a digital value can be transmitted to the ventilating system corresponding to a drive force, a CFM requirement, or other motor or ventilation metric that affects exhaust fan drive force. In systems without built-in motor control logic, the exhaust ventilation force can be reduced by controlling the voltage and/or amperage supplied to the exhaust fan drive motor. The presently claimed invention contemplates integration of the teachings disclosed herein into a complete ventilating system. In addition, the presently claimed invention can be incorporated into an existing ventilating system.

Detecting a Reduction in Ventilation Demand

The presently claimed invention saves energy by reducing the energy consumed by a ventilation system due to excess ventilation, particularly ventilation of equipment and workstations (collectively, "equipment") that are not in operation. Non-operation is detected by monitoring an ON/OFF switch of a piece of equipment and by detecting the absence of fumes to be ventilated at the equipment. Detecting the absence of fumes is accomplished by monitoring an appropriate fume detector installed in an exhaust ventilation point at the equipment. Non-operation of a particular piece of equipment can also be programmed into either the exhaust ventilation system controller or the exhaust ventilation point controller for that piece of equipment, such as scheduling non-operation during a night shift or weekend. Such non-operation can be scheduled for an entire facility, for a single exhaust ventilation point, or a plurality of exhaust ventilation points. Non-operation can be inferred by the lack of fumes detected at the equipment over a pre-determined period of time. The predetermined period of time is selected as appropriate for the type of work associated with the equipment. The predetermined period of time can be shortened during off-hours, when it is anticipated that the equipment will be in a state of non-operation, such as late at night or on weekends. When non-operation is detected, the damper in the exhaust ventilation point is closed and the differential pressure sensor across the damper can be monitored for air flow. When non-operation of the equipment is detected by monitoring the ON/OFF switch, the closing of the damper is preferably delayed to be sure that no latent fumes remain that need to be ventilated. The delay can be a predetermined period of time or the delay can be continued until the detection of fumes falls below a predetermined threshold that is deemed to be safe by the designers of the ventilation system. An additional delay can also be implemented for after the equipment is turned OFF, for example when the ON/OFF switch is turned OFF. This additional delay can be implemented independent of fume detection, such as to remove heat from the equipment. In an exemplary application, an additional delay of one hour can be implemented before closing of the damper. Once the damper is closed, the ventilation point controller sends an appropriate signal to the ventilation system controller to reduce the exhaust ventilation force generated by the exhaust fan. Additionally, a lock-out signal can be asserted over the equipment ON/OFF switch to hold the equipment in an OFF state until the damper is re-opened.

Alarm Conditions

An exhaust ventilation point comprises a differential pressure sensor across the damper that is monitored by the exhaust ventilation point controller. If the damper is opened, and the differential pressure sensor detects no air flow through the damper, an alarm is generated by the exhaust ventilation point controller. If the equipment switch is in the ON position and the damper has not opened, an alarm can be generated. If the equipment switch is ON and the damper is closed and fumes are detected above a threshold value, an alarm is generated. If the equipment switch is OFF and the damper is closed and fumes are detected above a threshold value, the damper is opened. The above alarm conditions are illustrative and not intended to be limiting. One of skill in the art, in possession of the present disclosure, can discern more alarm conditions that could be generated. Any of these alarm conditions can additionally remain asserted until a person manually resets the alarm state.

System Architecture

The above features have been described in terms of using a controller at each exhaust ventilation point and such controllers are communicatively coupled to an exhaust ventilation system controller. The architecture is essentially a master-slave distributed architecture, coupled by a communication network. It is further contemplated that such a system could be distributed across multiple physical locations or buildings and linked into a single system across a network such as the Internet. One skilled in the art will recognize that a controller could be allocated for a plurality of exhaust ventilation points in a "zone" configuration by physical locality. Alternatively a controller could be allocated for a plurality of exhaust ventilation points based upon the nature of the equipment used, fume types detected, or volume of ventilation required. The exhaust ventilation point controllers can alternatively be all implemented in a single central controller, or a combination thereof. In yet another configuration, any or all of the ventilation point controllers and the exhaust ventilation system controller can be implemented in a cloud computing environment using infrastructure as service, software as a service, and network as a service, providing a remote location for system monitoring and administration.

In operation, a method of increasing the energy efficiency of an exhaust ventilation system comprises individually controlling and monitoring a plurality of exhaust ventilation points that are interconnected by a common duct work that receives exhaust ventilation force from an exhaust ventilation fan. Each exhaust ventilation point provides exhaust ventilation for a piece of equipment having a monitorable and controllable ON/OFF switch. When that equipment is not in use, the exhaust ventilation point can be shut off, thereby reducing the load on the exhaust ventilation system. In response to shutting off an exhaust ventilation point, the exhaust ventilation system fan can be reduced in speed thereby saving energy. Algorithms for automatic shutoff of one or more exhaust ventilation control points can further enhance energy savings. For example, if a particular exhaust ventilation point has not detected fumes for a predetermined period of time, the exhaust ventilation point can be closed. In addition, during hours which a facility is known to not be working, or a smaller crew is working, particular exhaust ventilation points can be programmed to shut off and their associated equipment locked in the OFF position, for personnel safety.

It will be readily apparent to one skilled in the art that other modifications may be made to the embodiments without departing from the spirit of the scope of the invention as defined by the appended claims.

What is claimed is:

1. A method of increasing an efficiency of an exhaust ventilation system that comprises an exhaust ventilation fan that generates a ventilating force in an exhaust ventilation system duct, an exhaust ventilation system controller, and a plurality of exhaust ventilation points coupled to the exhaust ventilation system duct, each exhaust ventilation point having an exhaust ventilation load, a controllable damper, an exhaust ventilation point ductwork coupled to the controllable damper and to the exhaust ventilation system duct, a differential pressure sensor, a piece of equipment having an equipment ON/OFF switch and that generates fumes and is ventilated by the exhaust ventilation point ductwork, a system airflow sensor coupled to the exhaust ventilation system duct and an exhaust ventilation point controller coupled to the controllable damper, the differential pressure sensor, the system airflow sensor and the ON/OFF switch, the method comprising:

reducing, by the exhaust ventilation system controller, the ventilation force generated by the exhaust ventilation fan in response to detecting a reduction in the exhaust ventilation load of at least one exhaust ventilation point, selectively adjusting a speed of the exhaust ventilation fan such that the system airflow sensor reads a predetermined level regardless of a current position of each damper in each of the exhaust ventilation points, and selectively adjusting the damper of each exhaust ventilation point such that the differential pressure sensor of each exhaust ventilation point reads a predetermined level.

2. The method of claim 1, wherein detecting a reduction in the exhaust ventilation load of at least one exhaust ventilation point comprises detecting that the controllable damper of the at least one exhaust ventilation point has closed.

3. The method of claim 1, wherein detecting a reduction in the exhaust ventilation load of at least one exhaust ventilation point comprises detecting that the differential pressure across the controllable damper of the at least one exhaust ventilation point indicates that the controllable damper has closed.

4. The method of claim 1, wherein detecting a reduction in the exhaust ventilation load of at least one exhaust ventilation point comprises detecting that the ON/OFF switch for the piece of equipment that is ventilated by the at least one exhaust ventilation point has changed to the OFF position.

5. The method of claim 4, further comprising delaying the reducing of the exhaust ventilation force for a predetermined period of time after detecting that the ON/OFF switch has changed to the OFF position.

6. The method of claim 1, wherein the at least one exhaust ventilation point further comprises a fume detector coupled to the exhaust ventilation point controller, and detecting a reduction in the exhaust ventilation load of the at least one exhaust ventilation point further comprises determining that fumes detected by the fume detector are below a predetermined threshold value.

7. The method of claim 6, wherein detecting a reduction in the exhaust ventilation load of at least one exhaust ventilation point further comprises determining that fumes detected by the fume detector have remained below a predetermined threshold value for a first predetermined period of time.

8. The method of claim 7, wherein detecting a reduction in the exhaust ventilation load of at least one exhaust ventilation point further comprises the exhaust ventilation point controller determining that fumes detected by the fume detector have remained below a predetermined threshold value for a second predetermined period of time, shorter than the first predetermined period time, during a window of time that the equipment is scheduled for non-operation.

9. A non-transitory computer-readable medium programmed with processor-executable instructions that, when executed, implement a method of increasing an efficiency of an exhaust ventilation system that comprises an exhaust ventilation fan that generates a ventilating force in an exhaust ventilation system duct, an exhaust ventilation system controller, and a plurality of exhaust ventilation points coupled to the exhaust ventilation system duct, each exhaust ventilation point having an exhaust ventilation load, a controllable damper, an exhaust ventilation point ductwork coupled to the controllable damper and to the exhaust ventilation system duct, a differential pressure sensor, a piece of equipment having an equipment ON/OFF switch and that generates fumes and is ventilated by the exhaust ventilation point ductwork, a system airflow sensor coupled to the exhaust ventilation system duct, and an exhaust ventilation point controller coupled to the controllable damper, the differential pressure sensor, the system airflow sensor and the ON/OFF switch, the method comprising:

reducing, by the exhaust ventilation system controller, the ventilation force generated by the exhaust ventilation fan in response to detecting a reduction in the exhaust ventilation load of at least one exhaust ventilation point, selectively adjusting a speed of the exhaust ventilation fan such that the system airflow sensor reads a predetermined level regardless of a current position of each damper in each of the exhaust ventilation points, and selectively adjusting the damper of each exhaust ventilation point such that the differential pressure sensor of each exhaust ventilation point reads a predetermined level.

10. A system for increasing the efficiency of an exhaust ventilation of an area, the system comprising:
  a. an exhaust ventilation system controller;
  b. an exhaust ventilation fan coupled to a system of ductwork and operably coupled to the exhaust ventilation system controller, wherein the exhaust ventilation fan generates an exhaust ventilation force in the system of ductwork;
  c. a plurality of exhaust ventilation points coupled to the system of ductwork each exhaust ventilation point comprising:
    i. a piece of equipment, wherein the piece of equipment generates and outputs fumes and includes an ON/OFF switch, further wherein the exhaust ventilation point has an exhaust ventilation load corresponding to the piece of equipment;
    ii. exhaust ventilation point ductwork coupled to the system of ductwork and positioned proximate the piece of equipment to collect the fumes;
    iii. an exhaust ventilation point controller communicatively coupled to the exhaust ventilation system controller and coupled to the ON/OFF switch of the piece of equipment ventilated by the exhaust ventilation point;
    iv. a damper coupled to the exhaust ventilation point ductwork and coupled to the exhaust ventilation point controller; and
    v. a differential pressure sensor coupled to the exhaust ventilation point ductwork and to the exhaust ventilation point controller; and
    vi. a system airflow sensor coupled to the system of ductwork and to the exhaust ventilation system controller;
  wherein the exhaust ventilation system controller is configured to reduce the exhaust ventilation force generated by the exhaust ventilation fan in response to detecting a reduction in the exhaust ventilation load for at least one of the plurality of exhaust ventilation points, wherein the exhaust ventilation system controller is further configured to selectively adjust a speed of the exhaust ventilation fan such that the system airflow sensor reads a predetermined level regardless of a current position of each damper in each of the exhaust ventilation points, and the exhaust ventilation system controller is further configured to selectively adjust the damper of each exhaust ventilation point such that the differential pressure sensor of each exhaust ventilation point reads a predetermined level.

11. The system of claim 10, wherein detecting a reduction in the exhaust ventilation load of at least one exhaust ventilation point comprises detecting that the controllable damper of the at least one exhaust ventilation point has been closed.

12. The system of claim 10, wherein detecting a reduction in the exhaust ventilation load of at least one exhaust ventilation points comprises detecting that the ON/OF switch for the piece of equipment has changed to the OFF position.

13. The system of claim 12, wherein the exhaust ventilation point controller is further configured to delay indicating a reduction in the exhaust ventilation load to the exhaust ventilation system controller for a predetermined period of time after detecting that the ON/OFF switch has been change to the OFF position.

14. The system of claim 13, wherein the exhaust ventilation point damper is closed after expiration of the predetermined period of time.

15. The system of claim 10, wherein each exhaust ventilation point further comprises a fume detector coupled to the exhaust ventilation point controller, the exhaust ventilation point controller is configured to detect a reduction in the exhaust ventilation load of the at least one exhaust ventilation point and is further configured to determine that fumes detected by the fume detector are below a predetermined threshold value.

16. The system of claim 15, wherein the exhaust ventilation point controller is further configured to determine that fumes detected by the fume detector have remained below a predetermined threshold value for a first predetermined period of time.

17. The system of claim 16, wherein the exhaust ventilation point controller is further configured to determine that fumes detected by the fume detector have remained below a predetermined threshold value for a second predetermined period of time that is shorter than the first period of time, during a window of time that the equipment is scheduled for non-operation.

18. The system of claim 10, wherein the exhaust ventilation system controller comprises the plurality of exhaust ventilation point controllers.

19. The system of claim 10, wherein each exhaust ventilation point further comprises an alarm coupled to the exhaust ventilation point controller and the exhaust ventilation controller is configured to actuate the alarm upon detection by the exhaust ventilation controller of an alarm condition.

20. The system of claim 19, wherein the alarm condition comprises one of: a fume detector detecting fumes above a predetermined fume threshold when the air flow detected by the differential pressure sensor is below a predetermined air flow threshold, detecting that the damper is in the open and the air flow is below a predetermined air flow threshold, and that the equipment ON/OFF switch is in the ON position and the air flow is below a predetermined air flow threshold.

\* \* \* \* \*